United States Patent [19]

Fraser

[11] Patent Number: 4,465,346

[45] Date of Patent: Aug. 14, 1984

[54] OPTICALLY STABILIZED TELESCOPE

[76] Inventor: David B. Fraser, 1335 Slayton Dr., Maple Glen, Pa. 19002

[21] Appl. No.: 906,701

[22] Filed: May 17, 1978

Related U.S. Application Data

[63] Continuation of Ser. No. 514,054, Oct. 11, 1974, abandoned, which is a continuation of Ser. No. 300,528, Oct. 25, 1972, abandoned.

[51] Int. Cl.³ .................. G02B 27/64; G02B 23/00
[52] U.S. Cl. .................................................. 350/500
[58] Field of Search ................ 350/16; 356/148, 149, 356/248, 250

[56] References Cited

U.S. PATENT DOCUMENTS

| 731,101 | 6/1903 | Fecker | 350/51 |
| 1,628,776 | 5/1927 | Henderson | 350/16 |
| 2,944,783 | 7/1960 | MacLeish et al. | 350/16 |
| 3,468,595 | 9/1969 | Humphrey | 350/16 |
| 3,493,283 | 2/1970 | Higgins | 350/16 |
| 3,504,957 | 4/1970 | Heflinger et al. | 350/16 |

OTHER PUBLICATIONS

Optical Design–Military Handbook 141, pub. Oct. 5, 1962, pp. 13-21, 23, 34, 36.

Primary Examiner—Jon W. Henry
Attorney, Agent, or Firm—Caesar, Rivise, Bernstein & Cohen, Ltd.

[57] ABSTRACT

An image stabilized optical device including an objective lens, an eyepiece lens and a prism-composed, image erection system. The image erection system is disposed in the major optical axis of the device, and is gimballed for rotation about two axes normal to the major optical axis of the device.

5 Claims, 9 Drawing Figures

OPTICALLY STABILIZED TELESCOPE

This is a continuation of application Ser. No. 514,054, filed Oct. 11, 1974 now abandoned, which is a continuation of abandoned application Ser. No. 300,528, filed Oct. 25, 1972.

This invention relates generally to optical sighting instruments, and more particularly to image stabilized optical sighting instruments.

The optical performance of sighting instruments is severely limited by high-frequency, low-amplitude vibrations which may unavoidably be imparted to the instrument during its use. Such vibrations may result from hand tremor in the case of hand-held instruments such as binoculars, telescopes, etc. or platform vibration in the case of platform-mounted instruments such as weapons sights and result in the blurring or oscillation of the apparent image at the focal plane of the instrument. The higher the degree of magnification, the greater the oscillation of the apparent image as the instrument is vibrated. Accordingly, instruments suitable for use under conditions where vibration is unavoidable are generally of relatively low power (i.e. magnification) to minimize the degree of blurring or oscillation of the apparent image.

Various schemes for stabilizing an image in an optical instrument have been proposed but such schemes have several drawbacks.

For example, a few schemes have been proposed for mounting the entire viewing device in a flexible mount to provide a stabilized platform and thereby prevent rotation of the optical system but such "stabilized platform" devices are necessarily large and heavy and therefore have found limited use. Other stabilization schemes involve the use of stabilized gyroscopes to maintain a steady image while still others resort to the use of electronic image correction, via either inertial or optical feedback.

Other schemes have sought to add optical elements to an existing telescope. One such scheme utilizes a fluid prism in front of the objective lens. In that scheme several gyroscopes and servos are required to vary the geometry of the prism. In another such scheme plural mirrors are used to achieve the same result as the fluid prism.

All of the above schemes are relatively complex and expensive. In some schemes the expense results from the addition of various optical elements in the optical system. In other schemes, while no optical elements are added to the optical system, the optical system of necessity must be designed to accommodate the stabilizing device, thereby degrading the optical performance of the optical system as well as increasing cost.

In U.S. Pat. No. 3,504,957 there is disclosed a stabilization scheme for an in-line telescope having an objective lens and an eyepiece. An erection lens is mounted in a gimbal between the objective lens and the eyepiece. Although the stabilization scheme disclosed therein is relatively simple, its optical performance suffers somewhat due to the use of a lens erection system.

In U.S. Pat. No. 2,829,557 there is disclosed and claimed a complex binocular including an objective lens, an eyepiece lens and an image stabilized erection system therebetween. The system disclosed in that patent utilizes mirrors and prisms, some of which are mounted in gimbals and is rather complex mechanically. Furthermore, the binocular has a product of inertia in the roll-yaw plane which may produce a large coupling of roll motions into the yaw axis.

It is a general object of this invention to provide an optical sighting instrument having an improved image stabilization system.

It is another object of this invention to provide a stabilized optical sighting instrument whose optical design is not limited by the stabilization means utilized.

It is still another object of this invention to provide a stabilized optical sighting instrument which does not require power to operate the stabilization system.

It is yet another object of this invention to provide a stabilized optical sighting instrument which does not require the addition of optical elements to the optical system to achieve image stabilization.

It is a further object of this invention to provide a simple yet efficient image stabilized optical sighting instrument.

It is yet a further object of this invention to provide a relatively low cost image stabilized optical sighting instrument.

It is yet a further object of this invention to provide a hand-held optical sighting instrument having a stabilized image erection system.

It is still a further object of this invention to provide a relatively high-powered, hand-held optical sighting instrument having a stabilized image erection system.

These and other objects of this invention are attained by providing an optical viewing instrument having means for stabilizing the image developed thereby at an image plane comprising support means, an objective lens, an eyepiece lens and a prism composed, image erection system. The objective lens includes a principle plane therein and defines a major optical axis normal thereto. The image erection system is supported in the major optical axis by gimbal means.

Other objects and many of the attendant advantages of this invention will be readily appreciated as the same becomes better understood by reference to the following detailed description when considered with the accompanying drawings wherein:

FIG. 7 is a sectional view taken along line 7—7 of FIG. 4;

Figure 1:
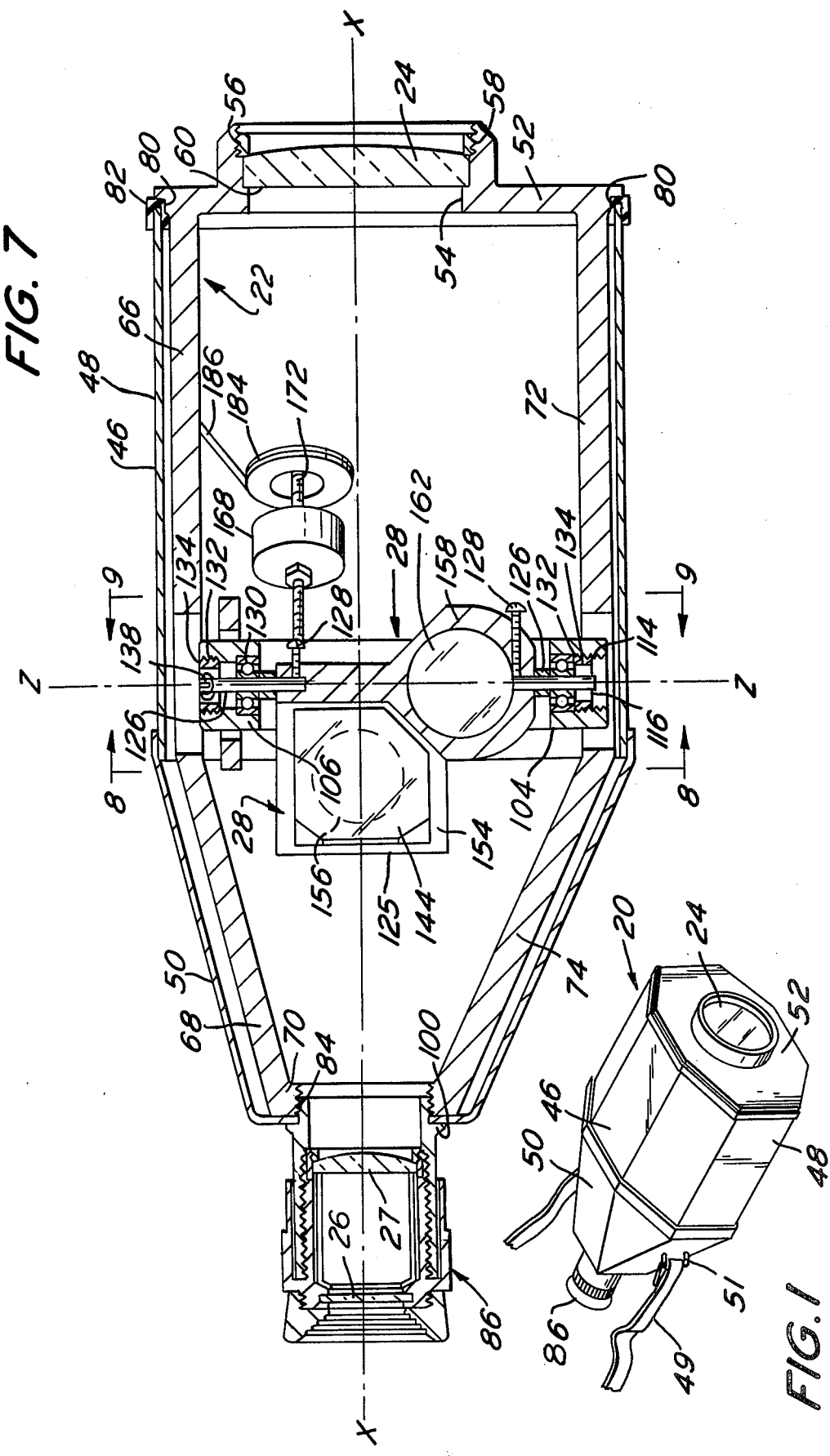
FIG. 1 is a perspective view of an image-stabilized telescope in accordance with this invention.

Referring now in greater detail to the various figures of the drawings wherein like reference characters refer to like parts, an image-stabilized telescope embodying the present invention is generally shown at 20 in FIG. 1. Telescope 20 basically comprises a support housing 22

Figure 4:
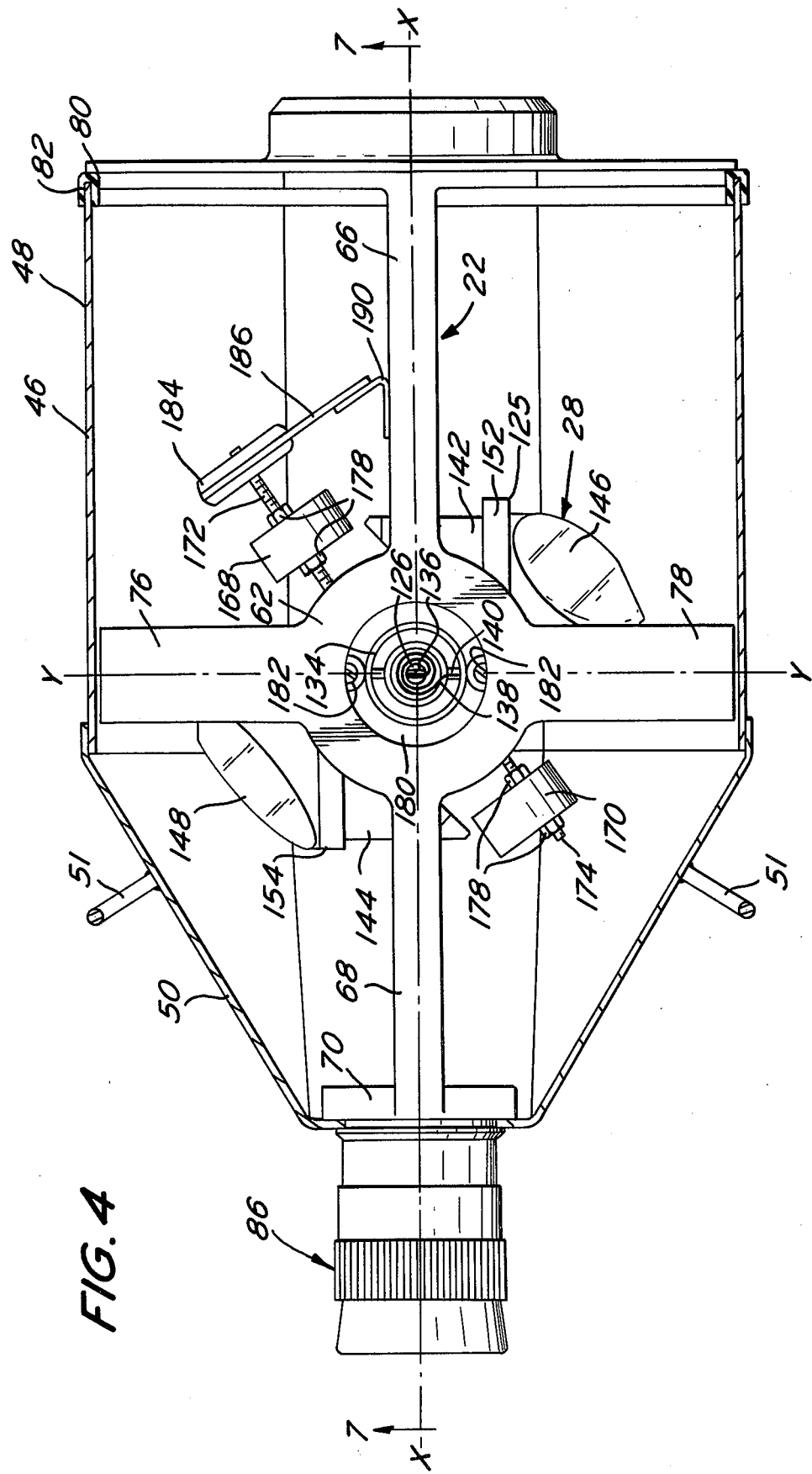
FIG. 4 is an enlarged top view, partially in section, of the image-stabilized telescope shown in FIG. 1.
Figure 5:
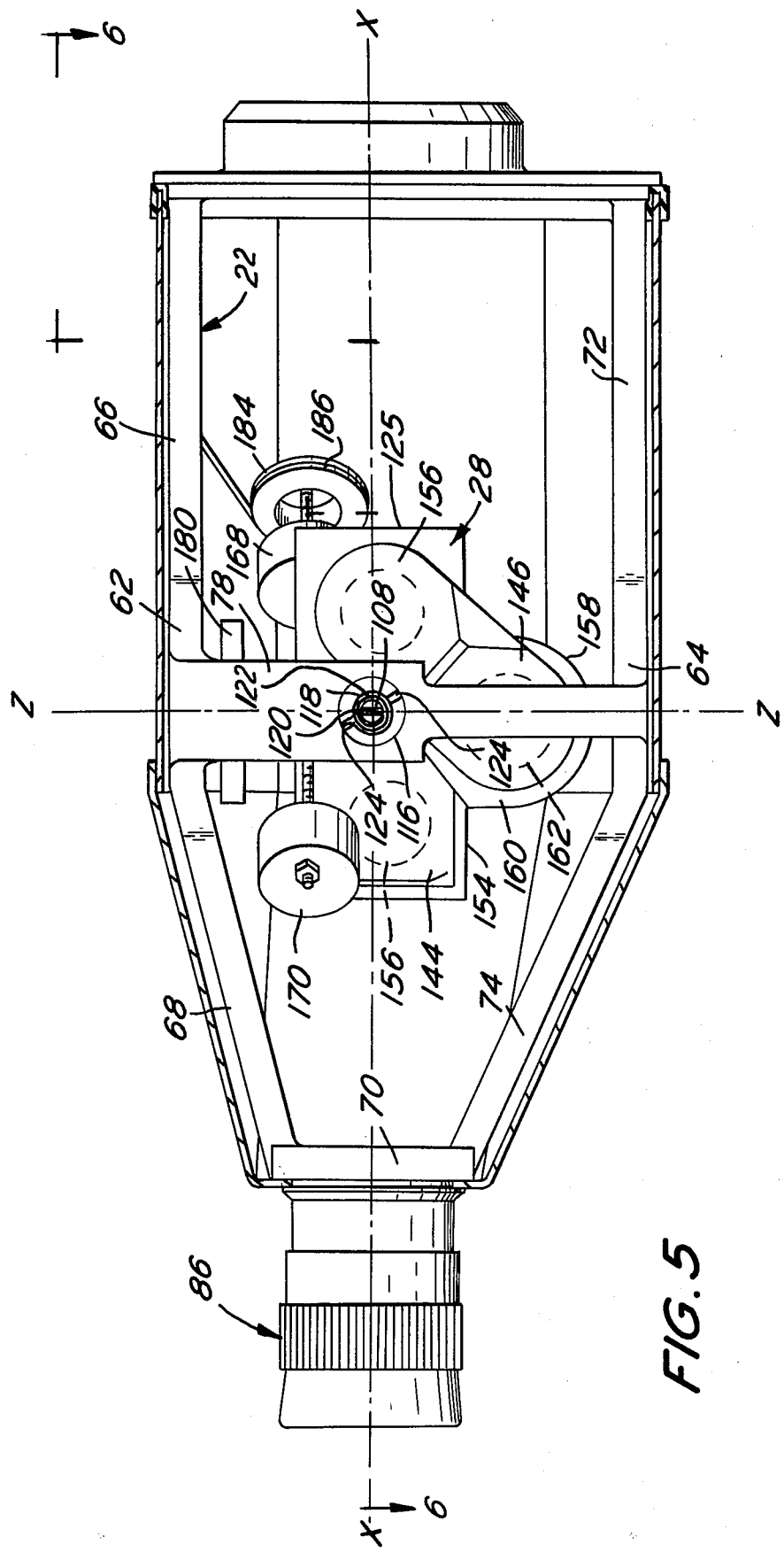
FIG. 5 is an enlarged side elevational view, partially in section, of the image-stabilized telescope shown in FIG. 1.

(FIG. 4), an objective lens 24 (FIG. 7), and eyepiece lens 26 (FIG. 7), and a stabilized image erection system 28 (FIG. 5).

The objective lens is disposed at one end of the housing and is adapted for receiving light rays from a distant object. The eyepiece lens is disposed at the opposite end of the housing and is adapted for enabling the user's eye to inspect an image provided by the objective at the image plane thereof. The image stabilization system 28 of the telescope is formed of plural prisms and is adapted for erecting the image provided by the objective lens at the image plane.

As will be considered in detail later, the prism erecting system is mounted on a gimbal located at a predetermined position in the telescope between the objective and eyepiece lenses. The particular arrangement and location of the gimbal and the prism-erecting system supported thereby enables the apparent image provided at the image plane, which image is inspected by the user's eye via the eyepiece lens, to be stabilized irrespective of slight angular rotations of the telescope, which rotations may result from high-frequency low-amplitude vibrations being imparted thereto.

Figure 2:
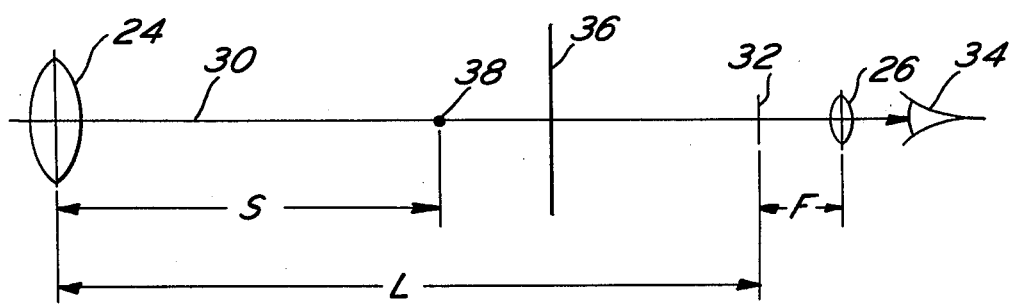
FIG. 2 is an optical schematic diagram of the image-stabilized telescope shown in FIG. 1 prior to a vibration being imparted thereto.

FIG. 2 is a schematic diagram of the optical features of the telescope 20 in accordance with this invention, prior to the telescope's being rotated by a vibration being imparted thereto.

Telescope 20 includes an objective lens 24, an eyepiece assembly 86 (FIG. 4) including an eyepiece lens 26 and a field lens 27 and a prism erecting system 28 (FIG. 5).

The objective lens 24 defines a major optical axis 30 (FIG. 2) which is normal to the principal plane of the objective lens and is coaxial with its nodal point. A light ray entering the nodal point of the objective lens will exit the objective lens and travel down its major optical axis.

The prism-erecting system 28 is disposed in the major optical axis of the telescope and includes plural prisms therein which are arranged to invert the image provided by the objective lens and to provide the erected image to the image plane 32 of the telescope 20. To that end, light rays parallel to the optical axis entering prisms system 28 a distance above the optical axis exit therefrom the same distance below the optical axis and vice versa. Similarly, light rays entering the prism system a distance to one side of the optical axis exit the prism system the same distance to the other side thereof.

The prism system 28 is shown schematically by a prism-equivalent plane 36. The optical property of the prism equivalent plane 36 is identical to that of the prism system 28, i.e. light rays parallel to the optical axis entering the prism-equivalent plane 36 a distance above the major optical axis of the telescope exit the equivalent plane the same distance below the major optical axis and rays entering the prism-equivalent plane at a distance to one side of the major optical axis exit the prism plane the same distance to the opposite side of the optical axis. The erected image from the prism-equivalent plane is provided to the image plane 32 of the telescope 20 for inspection by the eye 34 of the user, via eyepiece lens 26. To that end, the eyepiece lens is centered on the major optical axis and is spaced from the image plane by a distance equal to its focal length F. The distance between the image plane and the principle plane of the objective lens is denoted as L and is a function of the optical path through the prisms of the system 28.

In accordance with one aspect of this invention, the prism-equivalent plane 36 is maintained normal to the major optical axis 30 by a gimbal (not shown in FIGS. 2 and 3) which is disposed at the center of rotation 38 of the telescope 20. As will be seen hereinafter, this action effectuates the stabilization of the image provided at the image plane, irrespective of the location of the prism-equivalent plane along the major axis.

The distance between the principle plane of the objective lens and the center of rotation of the telescope is denoted at S.

In the unrotated condition shown in FIG. 2, the line of sight of the telescope is down the optical axis 30 and the optical axis is coaxial with the mechanical axis of the telescope.

Figure 3:
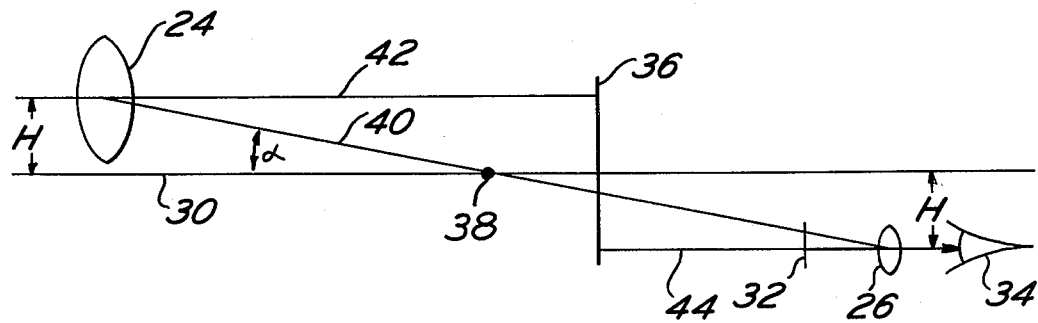
FIG. 3 is an optical schematic diagram of the image-stabilized telescope shown in FIG. 1 having been rotated as a result of a vibration having been imparted thereto.

In FIG. 3 there is shown a schematic diagram of telescope 20 which has been rotated with respect to the original line of sight or optical axis 30 as a result of a high frequency, low amplitude vibration being imparted thereto.

As can be seen therein, telescope 20 is rotated at an angle, alpha, to the major optical axis 30, i.e. the mechanical axis 40 of the telescope 20 is deflected to a position wherein it is at an angle, alpha, to the undeflected mechanical axis, which axis is coaxial with the major optical axis 30.

A light ray entering the objective lens 24 from a distant object passes through the lens down an axis 42 which is parallel to the major optical axis 30 and is referred to hereinafter as the deflected optical axis.

The prism system is gimballed such that it remains effectively angularly fixed in space with respect to the major optical axis when high-frequency, low-amplitude vibrations are imparted to the telescope, i.e. the prism equivalent plane remains normal to the major optical axis 30. Furthermore, the position of the gimbal along the deflected mechanical axis forms the reference point about which the telescope 20 can be considered to rotate.

In accordance with this invention, the position of the gimbal is located at the midpoint of the mechanical axis, i.e. $S=(L+F)/2$. When the gimbal is located at the midpoint of the mechanical axis, during any rotation of the telescope 20 caused by a high-frequency, low-amplitude vibration, the objective lens 24 deflects some distance away from the major optical axis 30 (the original mechanical axis) whereas the eyepiece lens 26 deflects the same distance away from the optical axis but in the opposite direction therefrom.

In FIG. 3 the distance that the objective lens 24 deflects above the optical axis during a typical rotation is denoted as H. The eyepiece lens 26 deflects below the optical axis by an equivalent distance H.

As can be seen in FIG. 3, a light ray passing through the objective lens 24 passes down the deflected optical axis 42. The ray enters the prism system 28 as represented by the prism equivalent plane 36 at a distance H above the major optical axis 30. The ray is erected in the prism system and exits the prism equivalent plane 36 at a distance of H below the major optical axis and thereafter travels along a path which is parallel to the major optical axis 30. The latter path is denoted by the reference numeral 44. Since the erected ray passes down path 44, which path is parallel to major optical axis 30 and displaced therebelow by a distance of H, the ray passes through the nodal point of the eyepiece which is also located a distance of H below the major optical axis (due to the rotation of the telescope about point 38).

The requirement for an apparently stable image is satisfied if a light ray leaves the eyepiece lens parallel to the original optical axis (as is the case shown in FIG. 3), since in such a case the eye of the user continues to see the image of the distant object along a line parallel to the original optical axis.

As should be appreciated by those skilled in the art, the position of the prism-equivalent plane along the optical axis is not critical since a light ray passing down the deflected axis 42 enters the prism-equivalent plane at a distance of H above the major optical axis and exits therefrom the same distance below, irrespective of the point at which the equivalent plane intersects axis 30. Therefore, so long as the objective and eyepieces lenses are each deflected to opposite sides of the major optical axis by the same distance H, an apparently stable image results.

If the gimbal is positioned at some other point in the mechanical axis of the telescope other than the center of rotation, then relative to the gimbal location, the objective lens deflects a different distance from the major optical axis than does the eyepiece, whereas the ray exiting the prism system exits the same distance from the major optical axis at which it enters (although on the opposite side thereof). In such an event the ray exiting from the prism system does not pass through the nodal point of the eyepiece. Accordingly, the apparent image provided to the eye of the user is not stabilized and will appear to oscillate.

The structural details of telescope 20 are shown in FIGS. 1 and 4 through 9. As can be seen in FIG. 1, telescope 20 includes an outer casing 46 which is preferably constructed of a metal such as aluminum and includes a main portion 48 and a tapered portion 50. A neck strap 49 is connected to the casing 46 via a pair of hooks 51.

A front plate 52 part of 22, the main frame, is connected to one end of main casing portion 48. As can be seen in FIG. 7, the front plate 52 includes an aperture 54, in which aperture the objective lens 24 is disposed. A threaded retaining ring 56 is screwed into threads 58 provided in aperture 54 to hold the objective lens against a shoulder 60 contiguous with said aperture.

The main frame 22 forms a support for the casing 46 and supports the optical elements of the telescope. To that end, frame 22 includes a pair of circular rings 62 and 64 disposed parallel to one another. Each ring includes struts projecting radially therefrom (see FIGS. 4 and 5). As can be seen in FIG. 4, ring 62 includes struts 66 and 68. Strut 66 projects from an upper part of the inside face of front plate 52 and is parallel to the plane of ring 62. Strut 68 entends in the opposite direction to strut 66 and is bent at an angle to the ring 62. Strut 68 terminates in a back plate 70 which is disposed parallel to the front plate 52. In a similar manner, a strut 72 radiates from ring 64 and also projects from the lower portion of the inside face of the front plate 52 (see FIG. 5). Strut 72 is disposed parallel to strut 62. A strut 74 radiates from the opposite side of ring 64 as strut 76 and is bent at an angle to ring 64 and terminates at the back plate 70 in a manner similar to strut 68.

A pair of generally U-shaped members 76 and 78 are connected between corresponding sides of the rings 62 and 64, respectively. The U-shaped members can be seen in FIGS. 8 and 9. As can be seen therein, one side of U-shaped member 78 is connected to ring 62 and the other side thereof is connected to ring 64. In a similar manner, one side of U-shaped member 76 is connected to ring 62 and the other side thereof is connected to ring 64.

The center of rings 62 and 64 define a line therebetween which intersects the mechanical axis of the telescope, i.e., the line connecting the center or nodal point of the objective lens and the center or nodal point of the eyepiece lens, at the center of rotation 38 of the telescope 20, i.e. a distance of (L+F)/2.

The rings, the struts, the U-shaped members, the front plate and the back plate are preferably formed as an integral metal casting.

As can be seen in FIGS. 4 and 5, a shoulder 80 is provided about the periphery of front plate 52. The shoulder is adapted for supporting thereon the front edge of the main portion 48 of casing 46. To that end, a rubber gasket 82 is interposed between the shoulder 80 and the main portion 48 of the casing 46.

As can be seen in FIGS. 4 and 5, the tapered portion 50 of the casing 46 is disposed over struts 68 and 74. Furthermore, the inside surface immediately adjacent the widest portion of tapered portion 50 is disposed about and abuts the outside surface of one end of main portion 48 of the casing.

Back plate 70 includes a threaded aperture 84 (FIG. 7) in which an eyepiece assembly 86 of conventional design is screwed.

As can be seen in FIG. 7, when the eyepiece is screwed into threaded ring 84 in the back plate 70, a flanged portion 100 holds the casing 50 against the back plate 70.

From the previous discussion it should be apparent that casing 46 is sealed to the front of the telescope as well as to the eyepiece housing.

Figure 6:
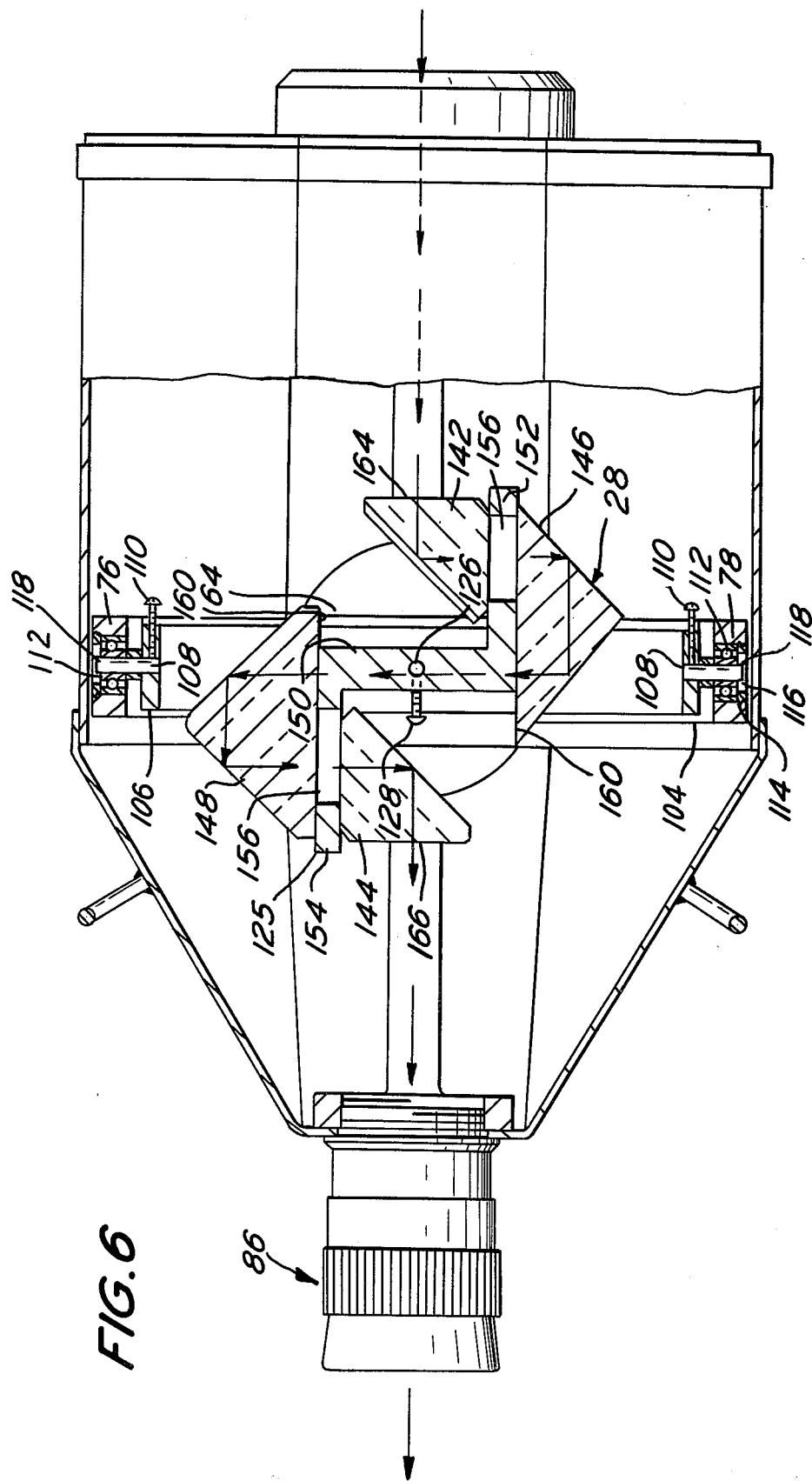
FIG. 6 is a sectional view taken along lines 6—6 of FIG. 5.

The U-shaped members 76 and 78 are adapted for supporting gimbal means 104 therein (FIGS. 4 and 6). The gimbal 104 supports the prism system 28 and enables the system to rotate about two orthagonal axes each of which is normal to the mechanical axis of the telescope.

The construction of the gimbal 104 and the associated components for supporting the prism system 28 can be seen in FIGS. 4, 6, 7, 8 and 9.

Figure 8:
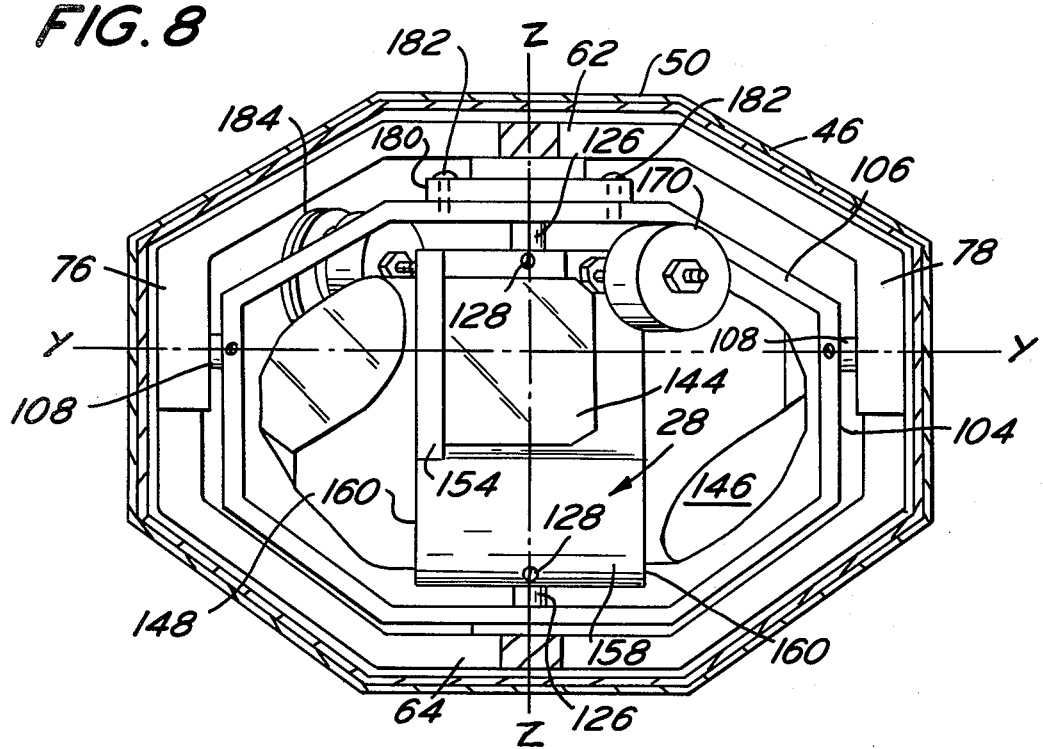
FIG. 8 is a sectional view taken along line 8—8 of FIG. 7.
Figure 9:
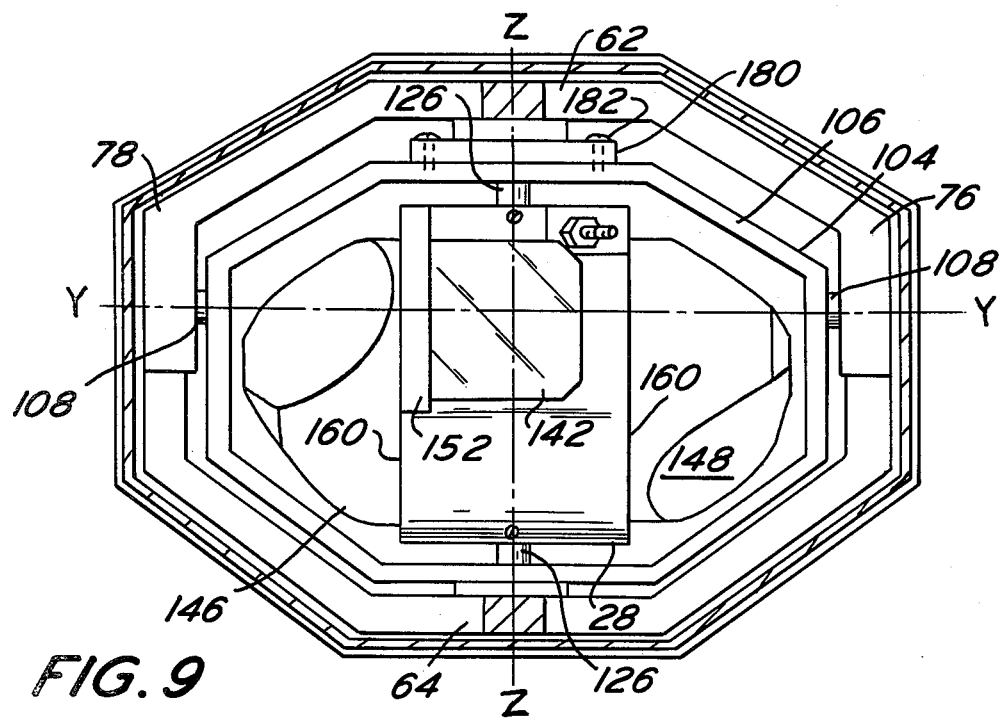
FIG. 9 is a sectional view taken along line 9—9 of FIG. 7.

As can be seen in FIGS. 8 and 9, gimbal 104 includes a frame 106 having the shape of an irregular octagon. The frame is pivoted for rotation about the elevation axis, denoted as Y—Y, which axis intersects the roll or mechanical axis of the telescope (denoted as X—X) at the center of rotation of the telescope and is normal thereto.

To that end, as can be seen in FIG. 6, the frame 106 includes a pair of pivot pins 108 which extend into holes in the sides of the frame 106 coaxial with the elevation axis. The pivot pins 108 are held firmly in place with respect to frame 106 by set screws 110. Each of the pivot pins 108 extends away from the frame 106 along the elevation axis and passes through a respective ball bearing 112 mounted in the U-shaped members 76 and 78 along said axis.

A viscous fluid such as a silicone oil is provided internally in ball bearing 112 to serve a damping function to be described later.

A threaded hole 114 is also provided in each of the U-shaped members 76 and 78 and coaxial with elevation axis. A threaded bearing retaining nut 116 is screwed into the threaded holes 114 and abuts the ball bearing 112 associated therewith to secure the ball bearing within the U-shaped member.

As can be seen in FIGS. 5 and 6, pivot pins 108 not only pass through the associated ball bearings 112 but also pass through an aperture 118 in the threaded insert 116. As can be seen in FIG. 5, pivot pin 108 includes a slotted end 120. One end of a helical spring 122 is disposed within the slotted end 120. The helical spring coils about pivot pin 108 and the other end thereof is disposed within a slot 124 provided in the bearing retaining nut 116.

When arranged in this manner, the spring 122 is effective for rotating frame 106 about the elevation axis to a neutral position which is normal to the mechanical axis of the telescope.

A prism-supporting member 125 is mounted for rotation about the yaw axis, denoted as Z—Z, which is normal to the roll axis X—X and elevation axis Y—Y and passes through their intersection, i.e., axis Z—Z passes through the center of rotation of the telescope 20. To that end, as can be seen in FIG. 7, supporting member 125 includes a pair of pivot pins 126 which are identical to pivot pins 108 and which extend into holes in the sides of member 125 which are coaxial with the yaw axis. The pivot pins 126 are held firmly in place with respect to the prism supporting member 125 by set screws 128. Each of the pivot pins 126 extends away from the support member 125 along the yaw axis and passes through a respective ball bearing 130 mounted in the frame 106 along that axis. A viscous fluid is provided internally in ball bearing 130. A threaded hole 132 is provided in frame 106 coaxial with the yaw axis Z—Z. A threaded ball bearing retaining nut 134 is screwed into the hole 130 and abuts the ball bearing 130 to hold it securely within frame 106.

The pivot pins 126 pass through an aperture in the associated ball bearing retaining nuts 134 and each pin includes a slotted end 136 (FIG. 4).

As can be seen in FIG. 4, one end of the helical spring 138 is disposed within the slotted end 136 of pin 126. The spring 138 coils about the pin 126 and its other end is disposed within a slot 140 in the bearing retaining nut 134.

When arranged in this manner, spring 138 is effective for rotating the prism support member 125 about the yaw axis to a neutral position normal to the mechanical axis of the telescope.

Since the prism support is mounted in frame 106 for rotation about the yaw axis and since the frame 106 is in turn itself mounted in U-shaped members 76 and 78 for rotation about the elevation axis, the prism support 125 is enabled to remain fixed in space with regard to a given orientation irrespective of rotation of the telescope about either the yaw or elevation axes as a result of a high-frequency, low-amplitude vibration being imparted thereto.

The prism system includes four prisms, two prisms, 142 and 144, being right angle prisms and two prisms, 146 and 148, being porro prisms. The prism support 125 is configured such that when the prisms 142, 144, 146 and 148 are mounted thereon in a manner to be described hereinafter, a light ray entering the objective lens enters the prism system, is erected, emerges from the prism system, and passes to the eyepiece.

As can be seen in FIG. 6, prism support member 125 includes a central web portion 150, a first flange 152 projecting normally from one side of the web portion adjacent an edge thereof and a second flange 154 projecting from the opposite side of the web and adjacent the opposite edge thereof. As can be seen, one of the pivot pins 126 is mounted in the middle of the upper edge of web portion 150. Each of the flanges includes a hole 156 extending therethrough.

The support member 125 also includes a bulbous portion 158 (see FIGS. 5 and 7) disposed below the web portion 150. The other pivot pin 126 is mounted in the middle of the lower portion of bulbous portion 158 (see FIG. 7).

The bulbous portion 158 includes two parallel end faces 160 (see FIGS. 8 and 9), each of which is flush with the outside face of an associated flange of the support member 125. A hole 162 (see FIG. 7) extends through the bulbous portion 158 normal to the end faces 160 and parallel to holes 156 (see FIGS. 5 and 7).

The prism support member 125 is mounted within frame 106 such that the holes 156 in its flanges 152 and 154 are disposed on either side of the elevation axis by an equal distance and are parallel thereto and that hole 162 extends directly below and parallel to the elevation axis.

The prisms of the prism system 28 are mounted as follows (see FIGS. 5 and 6): One side face of right angle prism 142 is mounted on one face of flange 152 directly over hole 156 therein. The mounting is effectuated via the use of an adhesive applied to the face of flange 152 contiguous with the hole 156 therein. A portion of the hypotenuse side of porro prism 146 is mounted to the opposite side of flange 152 and is disposed over hole 156. The connection of that portion of the porro prism to flange 152 is effectuated via an adhesive applied to the face of flange 152 contiguous with the hole 156. The other portion of the hypotenuse of the porro prism 146 is connected to face 160 of bulbous portion 158 and is disposed directly over the hole 162 extending therethrough. The connection of porro prism 146 to face 160 is effectuated via an adhesive provided on face 160 contiguous with the hole 162 therein.

In a similar manner, one portion of the hypotenuse of porro prism 148 is disposed over hole 162 and is adhesively connected to the other face 160 of bulbous portion 158 via an adhesive provided on the portion of face 160 contiguous with the hole 162. The remaining portion of the hypotenuse of the porro prism 148 is connected to the outside face of flange 154 and is disposed over hole 156 in the flange. The connection between the porro prism 148 and the flange 154 is effectuated via an adhesive provided on the face of flange 154 contiguous with the hole 156 therein.

One side of right-angle prism 144 is connected to the other side of flange 154 and is disposed over hole 156 therein. The connection of the right angle prism 144 to flange 154 is effectuated via an adhesive provided on the face of flange 154 contiguous with the hole 156 therein.

When the prisms are arranged in the manner described above, a face 164 of right angle prism 142 is parallel to and coaxial with the face 166 of right angle prism 144.

As previously noted, springs 122 and 138 serve to bias the frame 106 and the prism support 125 to their respective neutral rotational position or orientation. When support member 125 is in the neutral position, the faces 164 and 166 of the prisms 142 and 144, respectively, lie in and are normal to the mechanical axis of the telescope i.e., roll axis X—X. Accordingly, a light ray, denoted by the arrow in FIG. 6, entering the telescope 20 passes through the objective lens and down the roll axis. The ray enters the prism system via face 164 of prism 142 and is reflected off the hypotenuse thereof. The reflected ray then passes through hole 156 in flange 152 and enters the porro prism 146 via a portion of its hypotenuse face, whereupon the ray is doubly reflected, i.e. reflects from one face of said prism to another face, and passes out of another portion of the hypotenuse face thereof. The ray then passes through hole 162 entering a portion of the hypotenuse face of porro prism 148. The ray is then doubly reflected therein and passes out of another portion of the hypotenuse face of the porro prism 148. The ray then passes through hole 156 in flange 154 and enters a side face of right-angle prism 144. The ray then reflects off the hypotenuse face of prism 144, and exits through face 166. The ray exiting the face 166 is also coaxial with the roll axis and passes down said axis to the image plane where it comes to focus. The eye then inspects the image through the eyepiece lens.

Because the prism support 125 is decoupled from the telescope support and objective and eyepieces lenses in two axes, namely, the elevational axis Y—Y and the yaw axis Z—Z, movements of the telescope about either of these axes will not cause the prism support to follow that motion. Motions about the roll axis X—X do not affect the image and therefore do not need to be decoupled.

The springs 122 and 138, together with the inertia of the prism system and associated mounting components form a low pass mechanical filter such that only long period motions are coupled from the casing to the prisms. Such coupling is required in order to allow the user of this device to pan or tilt the telescope but to prevent higher frequency motions such as hand tremor or vehicle vibration from affecting the image. Telescope 20 does not require the use of any separate damping devices in the suspension system as have prior art stabilized telescopes.

In accordance with this invention, damping is provided by the use of the viscous fluid in the ball bearings 112 and 130. The motion of the balls in the bearing dissipates energy in the fluid as in any damper and therefore damps the resonance of the spring-mass system. This resonance would be objectionable if allowed to remain undamped.

It should be noted at this point that although the telescope herein described uses mechanical springs and fluid damping, such elements are not required as such in order for this system to operate, i.e. it is possible to generate a spring effect by the use of an electrical torque motor and a shaft-angle transducer in ways well known to the art of servo system design. Damping can be provided by the same means.

Telescope 20 includes means to provide static balance to the gimbal and to counteract a product of inertia or dynamic imbalance generated by the prisms and associated mounting structure. To that end, a pair of counterweights 168 and 170 (see FIG. 4) are provided on threaded shafts 172 and 174, respectively. Shaft 172 projects from the prism support 125 at an angle to the mechanical axis of the telescope. In a similar manner, shaft 174 projects from the prism support in essentially the opposite direction to the direction which shaft 172 extends but is offset therefrom.

Counterweight 168 is mounted on shaft 172 via a pair of jam nuts 178 and counterweight 170 is mounted on shaft 174 via a similar pair of jam nuts 178. Each of the counterweights may be individually moved along the shaft upon which it is mounted to effectuate a fine balance adjustment.

An additional balancing weight 180 in the shape of a ring is mounted on the top surface of frame 106 and is centered about the X—X axis. The ring weight 180 is connected to the frame 106 via a pair of screws 182. The disposition of the weight 180 and mounting screws 182 is shown in FIGS. 4, 8 and 9.

In order to protect the prism system from the effects of violent or high-amplitude vibrations, a circular rubber bumper 184 is disposed around shaft 172. The bumper prevents the gimballed prism system from rotating greater than a predetermined amount and also serves to absorb some of the shock resulting from such vibration and thus cushions the prism system.

As can be seen in FIGS. 4 and 7, circular rubber bumper 184 supported around shaft 172 by a brace 186 having a loop at one end thereof which is disposed within a groove in the periphery of bumper 184. The brace 186 includes a leg portion which is connected at an angle to the side of strut 66 via a brazed joint 190, such that when the prism support is in its neutral position, shaft 172 passes through the center of the opening in the circular rubber bumper.

Although heretofore the defining equation for the distance S between the principal plane of the objective lens and the center of rotation of the telescope has been defined in terms of the eyepiece focal length and the distance L between the principal plane of the objective lens and the image plane of the telescope, the distance S can also be defined in terms of the magnification M of the telescope, the focal length $F_o$ of the objective lens and the distance L. To that end it should be noted that the focal length F of the eyepiece is equal to $F_o/M$. A constant, denoted as a contraction ratio K, can be defined as being equal to $F_o/L$. The contraction ratio is a function of the optical path through the prisms which is usually somewhat longer than the mechanical length from the entrance to the exit of the prisms.

From the above definitions, it can be seen that the defining distance S for the gimbal location is equal to $$\frac{L}{2}\left(1 + \frac{K}{M}\right).$$

A practical implementation of the telescope 20 disclosed herein has a magnification of 12X and includes a prism system whose contraction ratio, K, is equal to 1.4.

It should be understood that this invention does not require any particular type of prism. For example, a roof pechan prism or a bauernfeind prism can be used. The only requirement is that the ingoing optical axis be coaxial with the outgoing optical axis.

Without further elaboration, the foregoing will so fully illustrate my invention, that others may, by applying current or future knowledge, readily adapt the same for use under various conditions of service.

What is claimed as the invention is:

1. An optical viewing instrument having means for stabilizing the image developed thereby at the image plane, comprising support means, an objective-lens, an eyepiece lens and a reflective image erection system, said objective lens including a principal plane therein and defining a major optical axis, said image erection system being supported in said optical axis by gimbal means, said gimbal means including a first member pivotably secured to said support means and adapted for rotation relative to said support means about a first axis normal to said major optical axis and a second member pivotably secured to said first member and adapted for rotation relative to said first member about a second axis normal to said first member and said major optical axis, said first and second axes intersecting at a first point in said major optical axis, said image erection system being secured to said second member with all of the elements of said image erection unit being movable as a single unit with said second member of said gimbal means, said gimbal means being statically balanced, and, said image erection system having coaxial input and output axes which are also coaxial with said major optical axis when said first and second members are in their normal position with respect to the major optical axis, said image erection system being composed of plane surfaces only and being non-dispersive wherein the rays of all colors coaxially entering the system along a line parallel to the optical axis coaxially exit the system parallel to the optical axis.

2. The instrument as specified in claim 1 wherein the eyepiece lens has a focal length of F and the distance between the principle plane of the objective lens and the image plane is L and wherein said first point in said optical axis is spaced from the principle plane of the objective lens by a distance equal to $(L+F)/2$.

3. An optical viewing instrument having means for stabilizing the image developed thereby at the image plane, comprising support means, an objective-lens, an eyepiece lens and an image erection system, said objective lens including a principal plane therein and defining a major optical axis, said image erection system being supported in said optical axis by gimbal means, said gimbal means including a first member pivotably secured to said support means and adapted for rotation relative to said support means about a first axis normal to said major optical axis and a second member pivotably secured to said first member and adapted for rotation relative to said first member about a second axis normal to said first member and said major optical axis, said first and second axes intersecting at a first point in said major optical axis and resilient restraining means for resiliently restraining the rotation of said first and second members, said means acting to return said members to said normal position with respect to said major optical axis, said first and second members being mounted in bearings, said bearings being impregnated with a very viscous fluid to effectuate the damping of said members, without recourse to other damping means.

4. The instrument of claim 3 wherein said image erection system is reflective and is secured to said second member with all of the elements of said image erection unit being movable as a single unit with said second member of said gimbal means, said gimbal means being statically balanced, and, said image erection system having coaxial input and output axes which are also coaxial with said major optical axis when said first and second members are in their normal position with respect to the major optical axis, said image erection system being composed of plane surfaces only and being non-dispersive wherein the rays of all colors coaxially entering the system along a line parallel to the optical axis coacially exit the system parallel to the optical axis.

5. An optical viewing instrument having means for stabilizing the image developed thereby at the image plane, comprising support means, an objective-lens, an eyepiece lens and a reflective image erection system comprising a pair of porro prisms and a pair of right angle prisms, said objective lens including a principal plane therein and defining a major optical axis, said image erection system being supported in said optical axis by gimbal means, said gimbal means including a first member pivotably secured to said support means and adapted for rotation relative to said support means about a first axis normal to said major optical axis and a second member pivotably secured to said first member and adapted for rotation relative to said first member about a second axis normal to said first member and said major optical axis, said first and second axes intersecting at a first point in said major optical axis, said image erection system being secured to said second member with all of the elements of said image-erection unit being movable as a single unit with said second member of said gimbal means, said gimbal means being statically balanced, and, said image erection system having coaxial input and output axes which are also coaxial with said major optical axis when said first and second members are in their normal position with respect to the major optical axis, said image erection system being composed of plane surfaces only and being non-dispersive wherein the rays of all colors coaxially entering the system along a line parallel to the optical axis coaxially exit the system parallel to the optical axis.

* * * * *